US012566402B2

(12) United States Patent
Mitsui

(10) Patent No.: US 12,566,402 B2
(45) Date of Patent: Mar. 3, 2026

(54) IMAGE FORMING APPARATUS FOR ARRANGING CIRCUIT BOARD

(71) Applicant: CANON KABUSHIKI KAISHA, Tokyo (JP)

(72) Inventor: Yuji Mitsui, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/756,429

(22) Filed: Jun. 27, 2024

(65) Prior Publication Data

US 2025/0004414 A1 Jan. 2, 2025

(30) Foreign Application Priority Data

Jun. 29, 2023 (JP) ................................ 2023-106709

(51) Int. Cl.
*G03G 15/00* (2006.01)
*G03G 21/16* (2006.01)

(52) U.S. Cl.
CPC ......... *G03G 15/80* (2013.01); *G03G 21/1619* (2013.01)

(58) Field of Classification Search
CPC ........................... G03G 15/80; G03G 21/1619
See application file for complete search history.

(56) References Cited

U.S. PATENT DOCUMENTS

2007/0207640 A1* 9/2007 Kawasaki .......... G03G 21/1619 439/76.2
2022/0342361 A1* 10/2022 Tanabe ............... G03G 21/1619
2023/0168622 A1* 6/2023 Hirai ...................... G03G 15/80 399/90

FOREIGN PATENT DOCUMENTS

JP 2014066915 A 4/2014
JP 2016136193 A 7/2016
JP 2017087685 A 5/2017
JP 2018024172 A 2/2018

* cited by examiner

*Primary Examiner* — Sandra Brase
(74) *Attorney, Agent, or Firm* — Canon U.S.A., Inc. IP Division

(57) ABSTRACT

An image forming apparatus includes a circuit board, first and second members, and a support member. The circuit board includes a first surface and a second surface that is a back side of the first surface in a direction orthogonal to the first surface. The first member supports the circuit board and covers at least one portion of the first surface of the circuit board. The second member covers at least one portion of the second surface of the circuit board. The support member is connected to the first member and the second member and supports the first member and the second member. The circuit board has a through-hole that penetrates from the first surface to the second surface. The support member passes through the through-hole and is connected to the first member and the second member.

11 Claims, 10 Drawing Sheets

IMAGE FORMING APPARATUS FOR ARRANGING CIRCUIT BOARD

BACKGROUND

Field

The present disclosure relates to an image forming apparatus that forms an image on a recording medium.

Description of the Related Art

Japanese Patent Application Laid-Open No. 2017-087685 discusses an image forming apparatus including a power supply substrate, a base member that covers a surface of the power supply substrate, a first shielding member that covers a back surface of the power supply substrate, and a second shielding member that is connected to the based member and the first shielding member. Various members such as a drive transmission mechanism support plate, a main substrate, the power supply substrate, and a fan are supported on an outer surface of the base member. The outer surface of the base member supports one end of the second shielding member to support the first shielding member.

In the image forming apparatus discussed in Japanese Patent Application Laid-Open No. 2017-087685, the second shielding member is present outside a range of outer periphery of the power supply substrate when viewed in a direction orthogonal to the surface of the power supply substrate. Consequently, an area that is a sum of an area surrounded by an outer periphery of the second shielding member and an area surrounded by the outer periphery of the power supply substrate is necessary so that the second shielding member and the power supply substrate are arranged on the outer surface of the base member when viewed in the direction orthogonal to the surface of the power supply substrate.

SUMMARY

The present disclosure is directed to reduction of space where a circuit board and a support member are arranged when viewed in a direction orthogonal to a surface of the circuit board.

According to an aspect of the present disclosure, an image forming apparatus includes a circuit board including a first surface and a second surface that is a back side of the first surface in a direction orthogonal to the first surface, a first member that supports the circuit board and covers at least one portion of the first surface of the circuit board, a second member that covers at least one portion of the second surface of the circuit board, and a support member connected to the first member and the second member and configured to support the first member and the second member, wherein the circuit board has a through-hole that penetrates from the first surface to the second surface, and wherein the support member passes through the through-hole and is connected to the first member and the second member.

Further features of the present disclosure will become apparent from the following description of exemplary embodiments with reference to the attached drawings.

DESCRIPTION OF THE EMBODIMENTS

An exemplary embodiment of the present disclosure is to be described with reference to the drawings.

An image forming apparatus 1 according to a first exemplary embodiment is to be described with reference to FIGS. 1 through 7. In the description below and each of the drawings, a vertical direction when the image forming apparatus 1 is placed on a horizontal plane is set to a Z direction. A direction intersecting with the Z direction and orthogonal to a first surface 100*f* of a circuit board 100 described below is set to a Y direction. The Y direction is also an axial direction of a photoconductor drum 11 that is to be described below. A direction intersecting with both of the Z direction and the Y direction is set to an X direction. The X and Y directions are preferably horizontal. The X, Y, and Z directions are preferably orthogonal to one another. The directions indicated by arrows X, Y, and Z illustrated in each of the drawings are respectively expressed as a +X direction side, a +Y direction side, and a +Z direction side as needed, whereas sides opposite the +X direction side, the +Y direction side, and the +Z direction side are respectively expressed as a −X direction side, a −Y direction side, and a −Z direction side as needed.

(Overall Configuration of Image Forming Apparatus)

Figure 1:
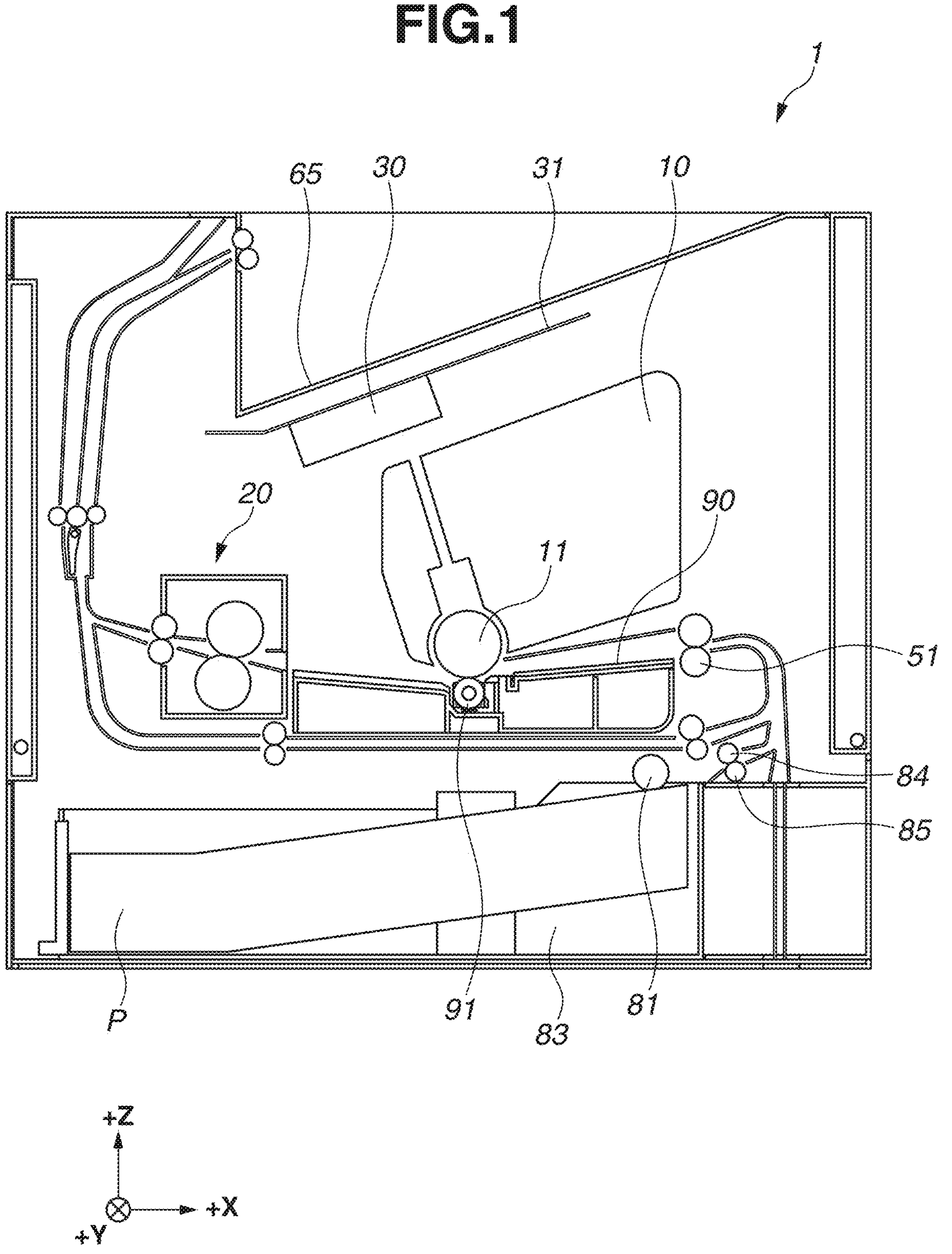
FIG. 1 is a schematic diagram illustrating an image forming apparatus according to a first exemplary embodiment.

An overall configuration of the image forming apparatus 1 is to be described with reference to FIG. 1. FIG. 1 is a schematic diagram illustrating a cross-sectional configuration of a laser beam printer as one example of the image forming apparatus 1 according to the present exemplary embodiment. Various sheet members having different sizes and qualities can be used as a sheet P that is a recording material (a recording medium). Examples of the various sheet members include paper such as plain paper and thick paper, a plastic film, cloth, a sheet member such as coated paper on which surface treatment has been performed, and a specially shaped sheet member such as an envelope and index paper.

The image forming apparatus 1 includes a scanner unit 30, a scanner stay 31, and a process cartridge 10. The process cartridge 10 includes the photoconductor drum 11, a development roller (not illustrated), and toner (not illustrated). The scanner unit 30 forms an electrostatic latent image on the photoconductor drum 11 based on image data. The photoconductor drum 11 is an image-bearing member that bears the electrostatic latent image.

The development roller develops the electrostatic latent image on the photoconductor drum 11 with toner. The process cartridge 10 is detachable from the image forming apparatus 1. The scanner stay 31 supports a scanner.

The image forming apparatus 1 includes a sheet feed tray 83, a pickup roller 81, a feed roller 84, a separation roller 85, and a conveyance roller pair 51. The sheet feed tray 83 accommodates sheets P. The pickup roller 81 conveys a sheet P from the sheet feed tray 83. The feed roller 84 and the separation roller 85 convey sheets P while separating the sheets P one by one by using a friction force. A transfer roller 91 transfers an image to the sheet P.

The image forming apparatus 1 includes a fixing unit 20 and a sheet discharge tray 65. The fixing unit 20 applies heat and pressure to the sheet P to fix the image transferred by the transfer roller 91. The sheet P which has passed the fixing unit 20 is discharged to the sheet discharge tray 65.

(Configuration of Frame Unit 2)

Figure 2:
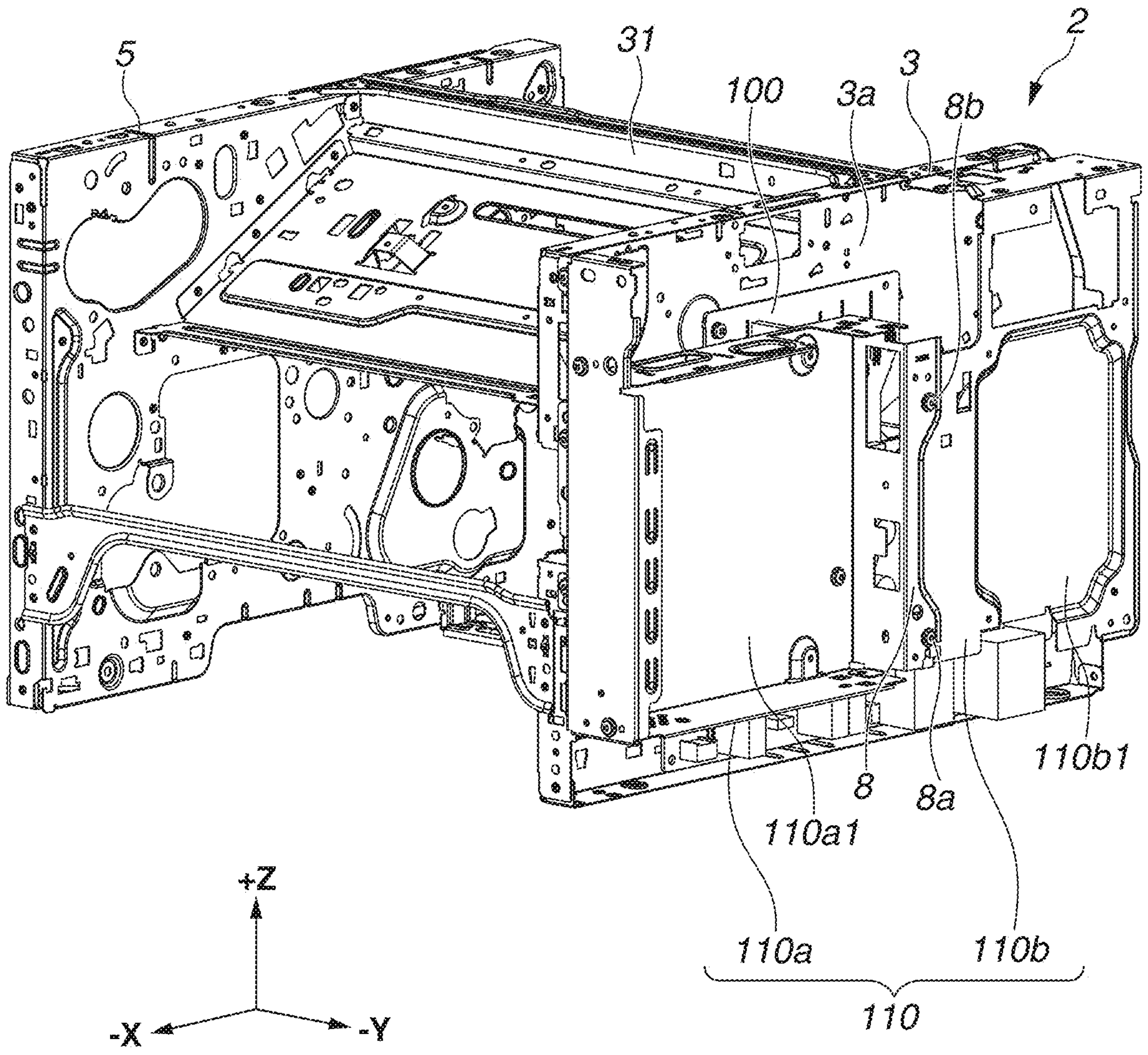
FIG. 2 is a perspective view illustrating a frame unit according to the first exemplary embodiment.

A configuration of a frame unit 2 is to be described with reference to FIG. 2. FIG. 2 is a schematic diagram illustrating a configuration of the frame unit 2 disposed inside the image forming apparatus 1. The frame unit 2 is disposed on a −Y direction side with respect to the image forming apparatus 1 as a whole.

The frame unit 2 includes a frame 3 (a first member), the circuit board 100, a support unit 110 (a second member), a controller 6, and a communication unit 7. The frame 3 supports the circuit board 100 and the support unit 110. The circuit board 100 is a substrate having a high-voltage power supply circuit and a low-voltage power supply circuit. The low-voltage power supply circuit supplies power to be used by, for example, the fixing unit 20. The high-voltage power supply circuit supplies power to be used by, for example, the process cartridge 10.

The frame 3 supports the support unit 110 by a support surface 3*a*. The circuit board 100 and the support unit 110 are positioned on the −Y direction side with respect to the frame 3. The circuit board 100 is positioned between the frame 3 and the support unit 110 in the Y direction. An end portion of the process cartridge 10 (not illustrated in FIG. 2) on a +Y direction side is fastened to a frame 5, whereas an end portion of the process cartridge 10 on the −Y direction side is fastened to the frame 3. An end portion of the scanner stay 31 on the +Y direction side is fastened to the frame 5, whereas an end portion on the scanner stay 31 on the −Y direction side is fastened to the frame 3.

The communication unit 7 receives print data from an external apparatus. The controller 6 controls an image forming operation of an image forming unit (the development roller, the photoconductor drum 11, and the transfer roller 91) based on the print data received by the communication unit 7.

The support unit 110 is formed of a metal plate. The support unit 110 includes a controller support portion 110*a* (a third member) and a communication unit support portion 110*b* (a fourth member) that are connected. Each of the controller support portion 110*a* and the communication unit support portion 110*b* is formed of a metal plate. The controller support portion 110*a* has a first support surface 110*a1* that supports the controller 6. The communication unit support portion 110*b* has a second support surface 110*b*1 that supports the communication unit 7. An end portion of the controller support portion 110*a* on a +X direction side and an end portion of the communication unit support portion 110*b* on a −X direction side are connected by screws 8*a* and 8*b*. That is, the support unit 110 includes a connection portion 8 in which the end portion of the controller support portion 110*a* on the +X direction side and the end portion of the communication unit support portion 110*b* on the −X direction side are connected. That is, the controller support portion 110*a* and the communication unit support portion 110*b* are arranged side by side in the X direction.

Figure 9A:
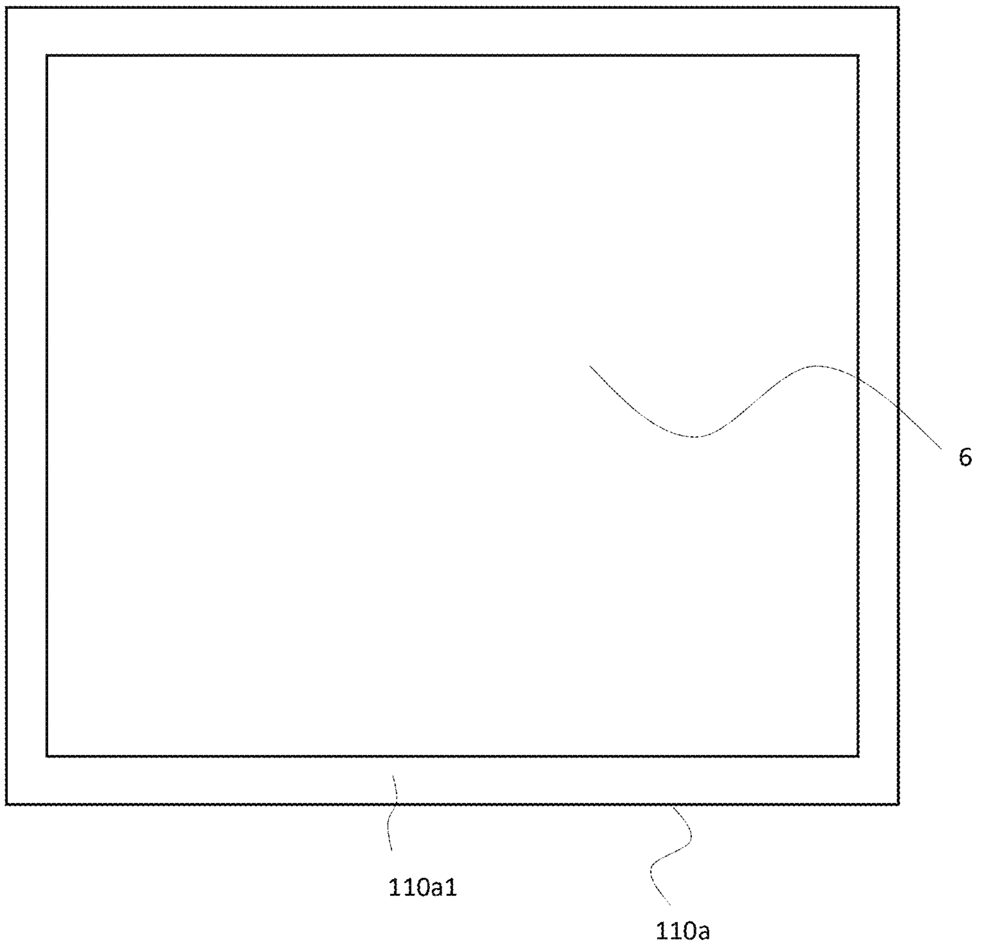
FIG. 9A is schematic diagram illustrating a controller 6 according to the first embodiment.
Figure 9B:
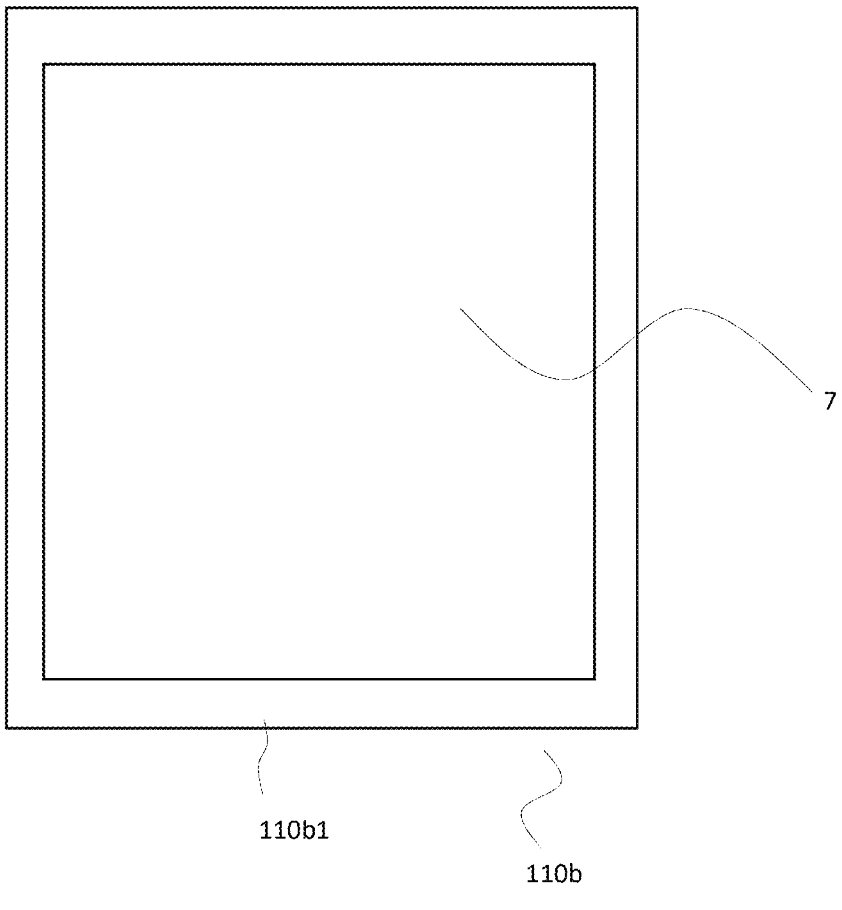
FIG. 9B is a schematic diagram illustrating a communication unit 7 according to the first embodiment.

The controller 6 is supported by the controller support portion 110*a*, as illustrated in FIG. 9A, whereas the communication unit 7 is supported by the communication unit support portion 110*b*, as illustrated in FIG. 9B.

(Configuration of Frame 3)

Figure 3:
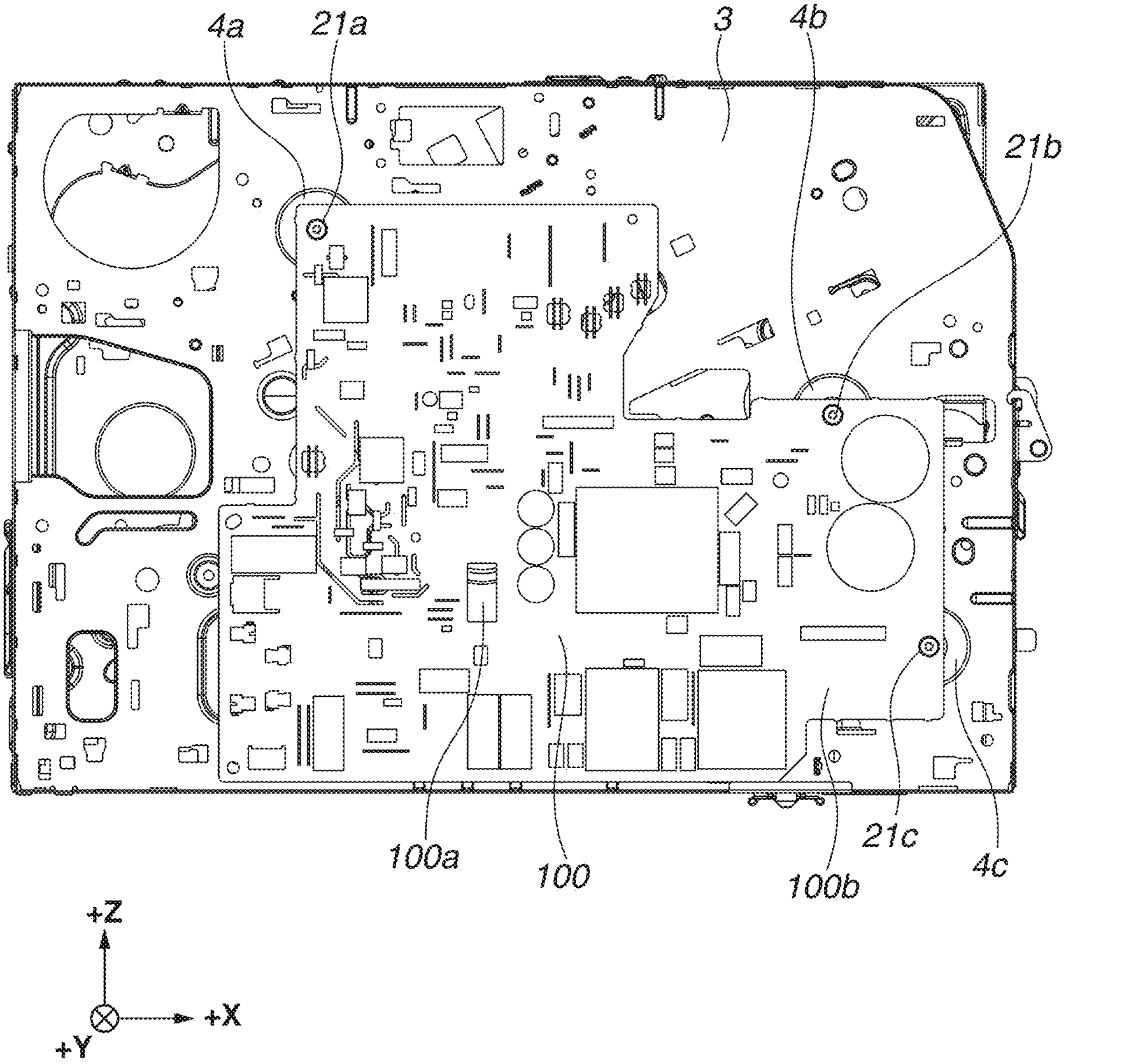
FIG. 3 is a plan view illustrating a frame and a circuit board according to the first exemplary embodiment.

A configuration of the frame 3 is to be described with reference to FIG. 3. FIG. 3 is a front view of the frame 3 as viewed in the Y direction. The frame 3 extends on an XZ plane. The frame 3 is formed of a metal plate. The frame 3 includes protrusions 4*a*, 4*b*, and 4*c* that protrude in a −Y direction. As illustrated in FIG. 3, the circuit board 100 is fastened to the protrusions 4*a*, 4*b*, and 4*c* with screws 21*a*, 21*b*, and 21*c*, respectively. The frame 3 covers at least one portion of the first surface 100*f* of the circuit board 100 to be described below.

(Configuration of Circuit Board 100)

Figure 7A:
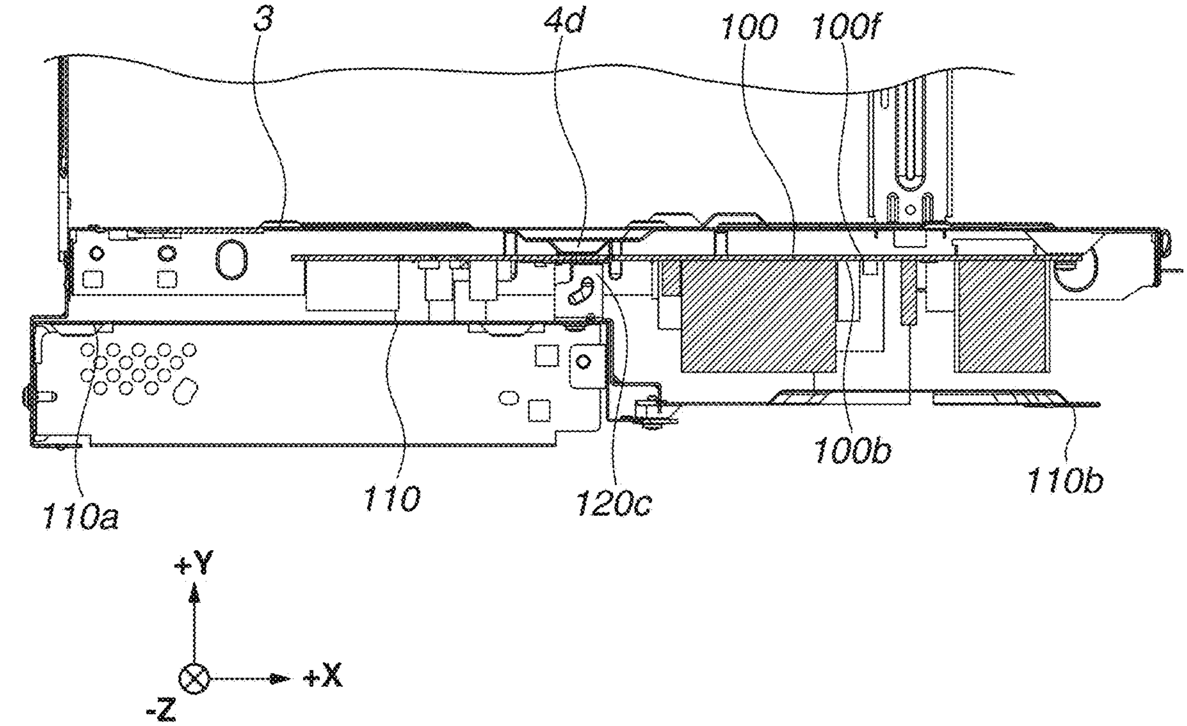
FIGS. 7A and 7B are plan views illustrating the frame, the circuit board, and the support unit according to the first exemplary embodiment.
Figure 7B:
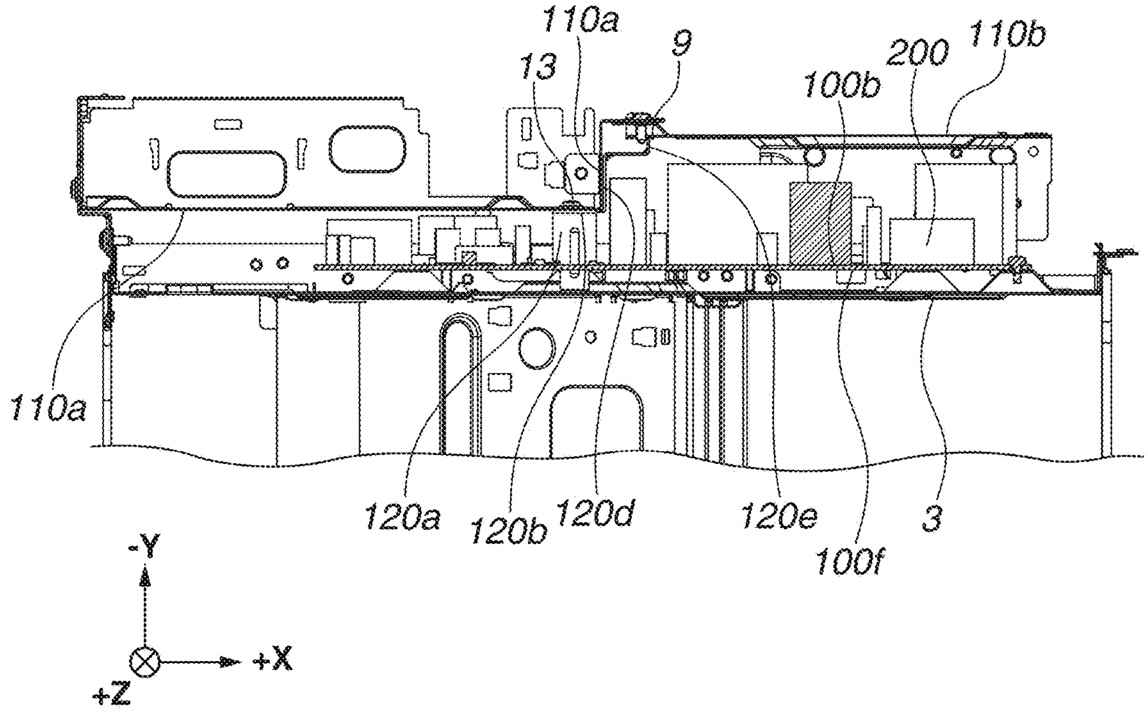

A configuration of the circuit board 100 is to be described with reference to FIGS. 3, 7A, and 7B. Each of FIGS. 7A and 7B is a diagram illustrating the circuit board 100, the frame 3, and the support unit 110 as viewed in the Z direction. As illustrated in FIGS. 7A and 7B, the frame 3 includes a protrusion 4*d* that protrudes in a −Y direction.

As illustrated in FIGS. 7A and 7B, the circuit board 100 includes the first surface 100*f*, the one portion of which is at least covered with the frame 3, and a second surface 100*b* on the back of the first surface 100*f* in a direction orthogonal to the first surface 100*f*. As illustrated in FIG. 3, the second surface 100*b* is a surface on which electric elements of the high-voltage power supply circuit and the low-voltage power supply circuit are mounted. The circuit board 100 has a through-hole 100*a* that penetrates from the first surface 100*f* to the second surface 100*b*.

That is, the through-hole 100*a* penetrates the circuit board 100 in the Y direction.

(Configuration of Support Unit 110)

Figure 4:
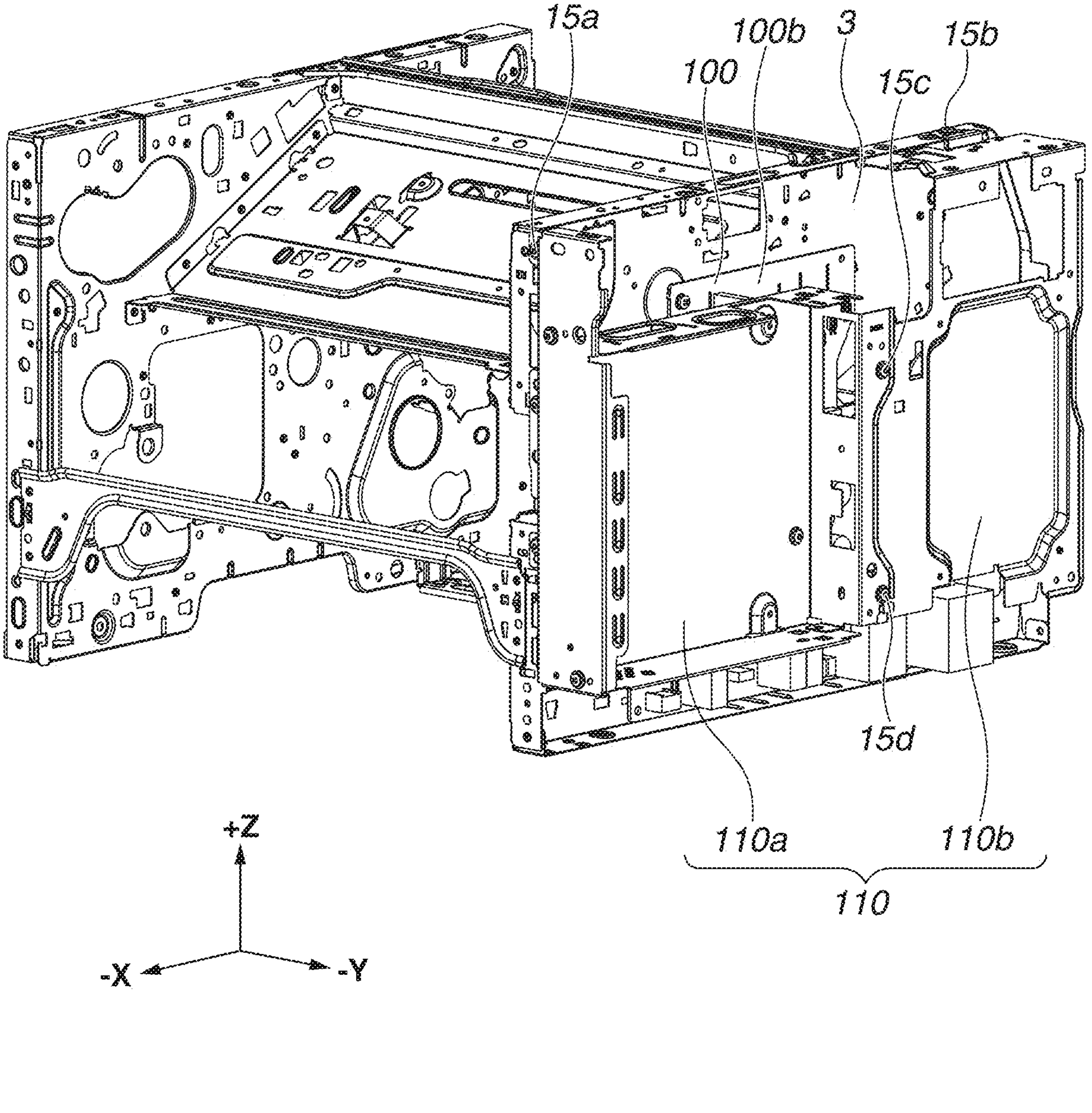
FIG. 4 is a perspective view illustrating a support unit attached to the frame according to the first exemplary embodiment.

A configuration of the support unit 110 is to be described with reference to FIG. 4. FIG. 4 is a diagram illustrating a state in which the support unit 110 is fastened to the frame 3. Screws 15*a* and 15*b* are fastening members with which the support unit 110 is fastened to the frame 3. One end portion of the support unit 110 on a −X direction side is fastened to the frame 3 with the screw 15*a*, whereas one end portion of the support unit 110 on a +Z direction side is fastened to the frame 3 with the screw 15*b*. The controller support portion 110*a* and the communication unit support portion 110*b* are fastened with screws 15*c* and 15*d*. In the X direction, the screws 15*c* and 15*d* are arranged between the screws 15*a* and 15*b*. The support unit 110 covers at least one portion of the second surface 100*b* of the circuit board 100.

(Configuration of Support Member 120)

Figure 5:
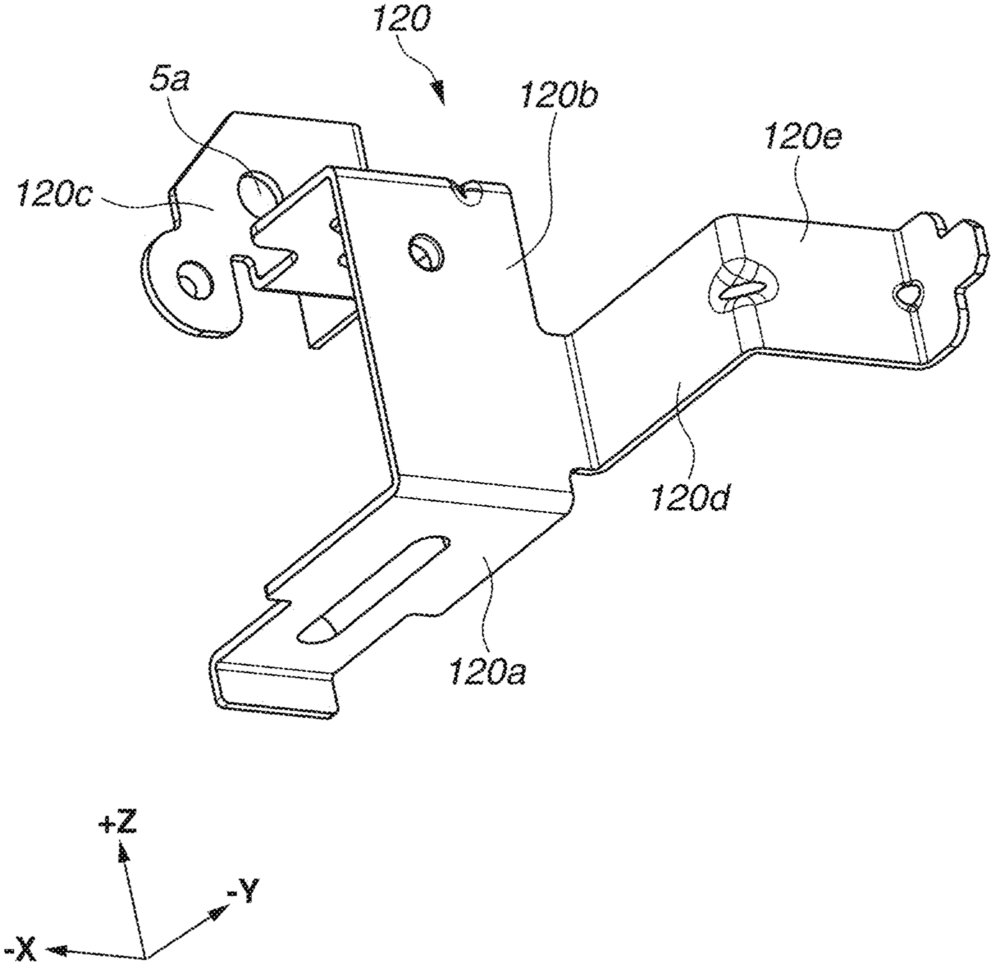
FIG. 5 is a perspective view illustrating a support member according to the first exemplary embodiment.

A configuration of a support member 120 is to be described with reference to FIG. 5. FIG. 5 is a diagram illustrating a configuration of the support member 120. The support member 120 is formed of a metal plate. The support member 120 includes a penetration portion 120*a*, a first contact portion 120*b*, a second contact portion 120*c*, a restriction portion 120*d*, and a third contact portion 120*e*. The penetration portion 120*a* extends in the Y direction. An end portion of the penetration portion 120*a* on a −Y direction side is connected to an end portion of the first contact portion

120*b* on a −Z direction side. The first contact portion 120*b* extends in the Z direction. An end portion of the first contact portion 120*b* on the +Z direction side is connected to an end portion of the second contact portion 120*c* on the +X direction side. The second contact portion 120*c* has a hole 5*a* that penetrates in the Y direction. The restriction portion 120*d* extends in the Y direction. An end portion of the restriction portion 120*d* on a +Y direction side is connected to the first contact portion 120*b*, and an end portion of the restriction portion 120*d* on the −Y direction side is connected to an end portion of the third contact portion 120*e* on the −X direction side. The third contact portion 120*e* has a protrusion extending in the Y direction. The penetration portion 120*a*, the first contact portion 120*b*, the second contact portion 120*c*, the restriction portion 120*d*, and the third contact portion 120*e* are to be described below.

Figure 6:
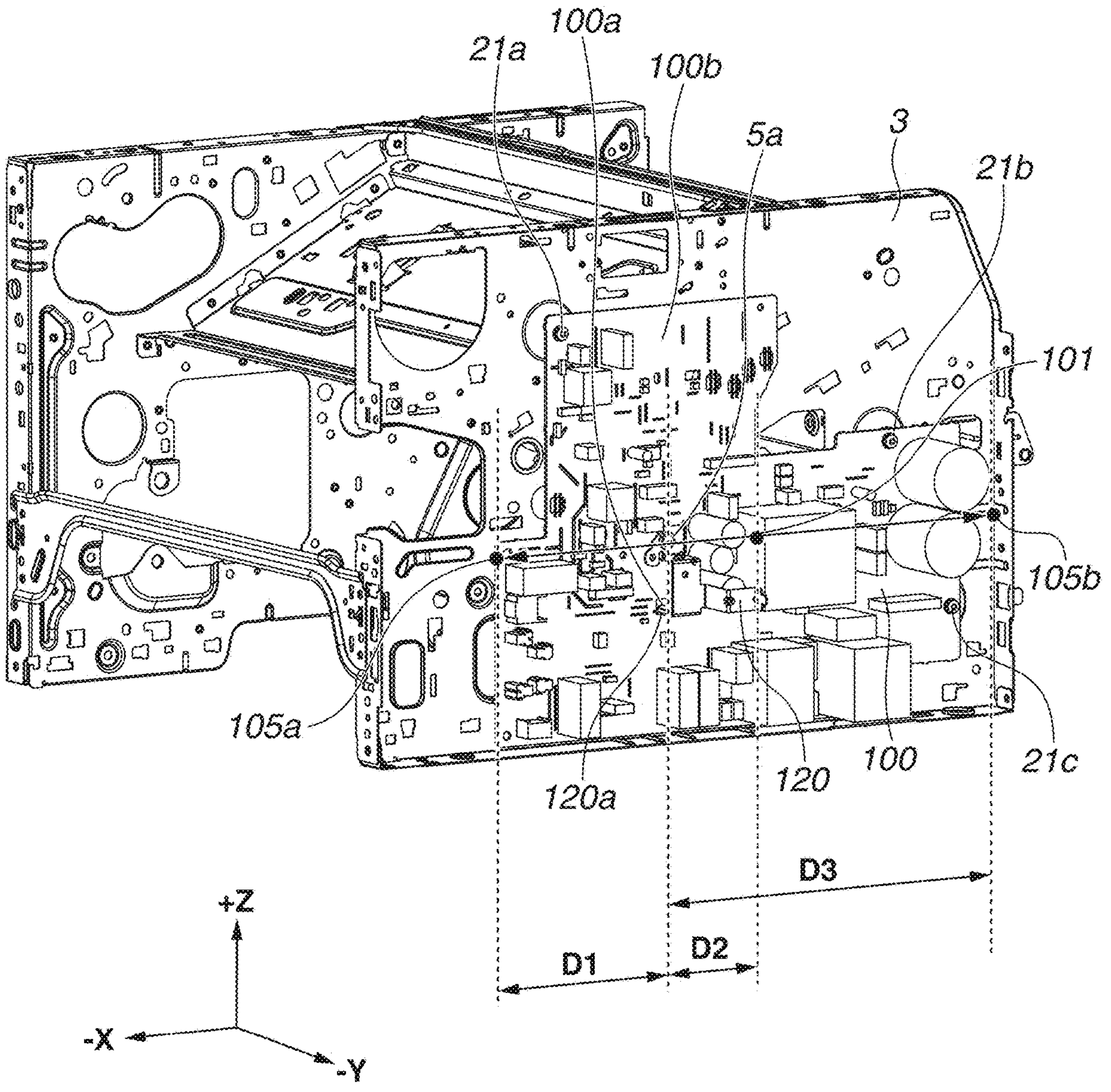
FIG. 6 is a perspective view illustrating the frame and the circuit board according to the first exemplary embodiment.

The second contact portion 120*c* and the penetration portion 120*a* are to be described with reference to FIGS. 6, 7A, and 7B. FIG. 6 is a perspective view illustrating the circuit board 100 and the frame 3. FIGS. 7A and 7B are diagrams illustrating the frame 3, the support member 120, and the circuit board 100 as viewed in the Z direction. The second contact portion 120*c* comes into contact with the second surface 100*b* of the circuit board 100, and the protrusion 4*d* comes into contact with the first surface 100*f* of the circuit board 100, thereby supporting the circuit board 100. As illustrated in FIG. 5, the second contact portion 120*c* has the hole 5*a*. As illustrated in FIG. 6, a screw is driven into the hole 5*a* in a +Y direction, so that the second contact portion 120*c* is fastened to the second surface 100*b*.

As illustrated in FIG. 6, the penetration portion 120*a* passes through the through-hole 100*a*. Moreover, as illustrated in FIG. 7B, the penetration portion 120*a* is in contact with the frame 3.

When the support unit 110 is fastened to the frame 3 with the screws 15*c* and 15*d*, the screws 15*c* and 15*d* are driven toward the +Y direction, and an external force in the +Y direction is applied to the support unit 110. The first contact portion 120*b* and the third contact portion 120*e* of the support member 120 are in contact with a surface of the support unit 110 on the +Y direction side. The penetration portion 120*a* and the third contact portion 120*e* are to be described below. Accordingly, in a case where the screws 15*c* and 15*d* are driven toward the +Y direction, the external force in the +Y direction is also applied to the support member 120. If the penetration portion 120*a* does not contact the frame 3, only the second contact portion 120*c* is in contact with the frame 3, and an external force in the +Y direction is applied to the support member 120 when the screws 15*c* and 15*d* are driven. Consequently, the support member 120 is likely to be deformed in the +Y direction side. According to the first exemplary embodiment, on the other hand, not only the second contact portion 120*c* but also the penetration portion 120*a* are in contact with the frame 3, and for this reason, the support member 120 is not likely to be deformed in the +Y direction.

As illustrated in FIG. 6, the support member 120 passes through the through-hole 100*a*. Thus, space where the circuit board 100 and the support member 120 are arranged can be reduced when viewed in a direction (the Y direction) orthogonal to the first surface 100*f*.

A first end portion 105*a* (one end) illustrated in FIG. 6 is an end portion of the circuit board 100 on a −X direction side.

A second end portion 105*b* (the other end) illustrated in FIG. 6 is an end portion of the circuit board 100 on a +X direction side. A center portion 101 is a location that is on the circuit board 100 and positioned equidistant from the first end portion 105*a* and the second end portion 105*b*. In the X direction, a distance D1 between the first end portion 105*a* and the hole 5*a* is longer than a distance D2 between the center portion 101 and the hole 5*a*. A distance D3 between the second end portion 105*b* and the hole 5*a* is longer than the distance D2 between the center portion 101 and the hole 5*a*. That is, in the X direction, the hole 5*a* is closer to the center portion 101 than the first end portion 105*a* and the second end portion 105*b* which are both ends of the circuit board 100 in the X direction. As illustrated in FIG. 6, the center portion 101 is away from screws 21*a*, 21*b*, and 21*c* in the X direction, and a portion near the center portion 101 is likely to be deformed by impact from the Y direction. However, since the circuit board 100 is fastened by the protrusion 4*d* and the second contact portion 120*c* in a position near the center portion 101 in the X direction, the circuit board 100 is unlikely to be deformed by impact from the Y direction.

The first contact portion 120*b*, the restriction portion 120*d*, and the third contact portion 120*e* are to be described with reference to FIG. 7B. The third contact portion 120*e* comes in contact with a contacted portion 9 (a first contacted portion) that is one portion of the support unit 110, thereby supporting the support unit 110. The contacted portion 9 is arranged on a surface of the support unit 110 on the +Y direction side. The first contact portion 120*b* comes into contact with a contacted portion 13 (a second contacted portion) of the controller support portion 110*a*, thereby supporting the support unit 110. The contacted portion 13 is arranged on a surface of the support unit 110 on the +Y direction side. The restriction portion 120*d* is arranged opposite the controller support portion 110*a* as viewed in a direction (a first direction) parallel to the first surface 100*f* within a horizontal direction, and restricts movement of the controller support portion 110*a* in the first direction (a +X direction). The third contact portion 120*e* comes into contact with the contacted portion 9 of the controller support portion 110*a*, thereby supporting the support unit 110.

(Through-Hole and Slit)

Figure 8A:
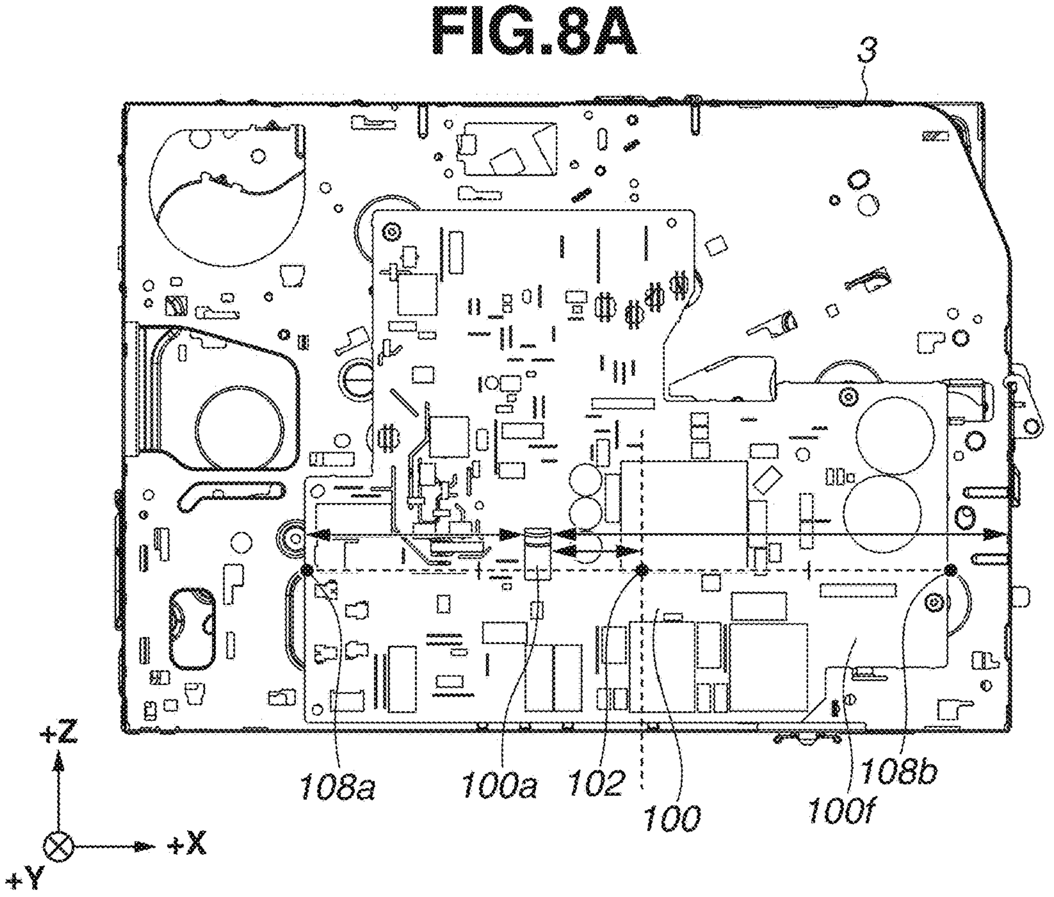
FIG. 8A is a plan view illustrating the frame and the circuit board according to the first exemplary embodiment.
Figure 8B:
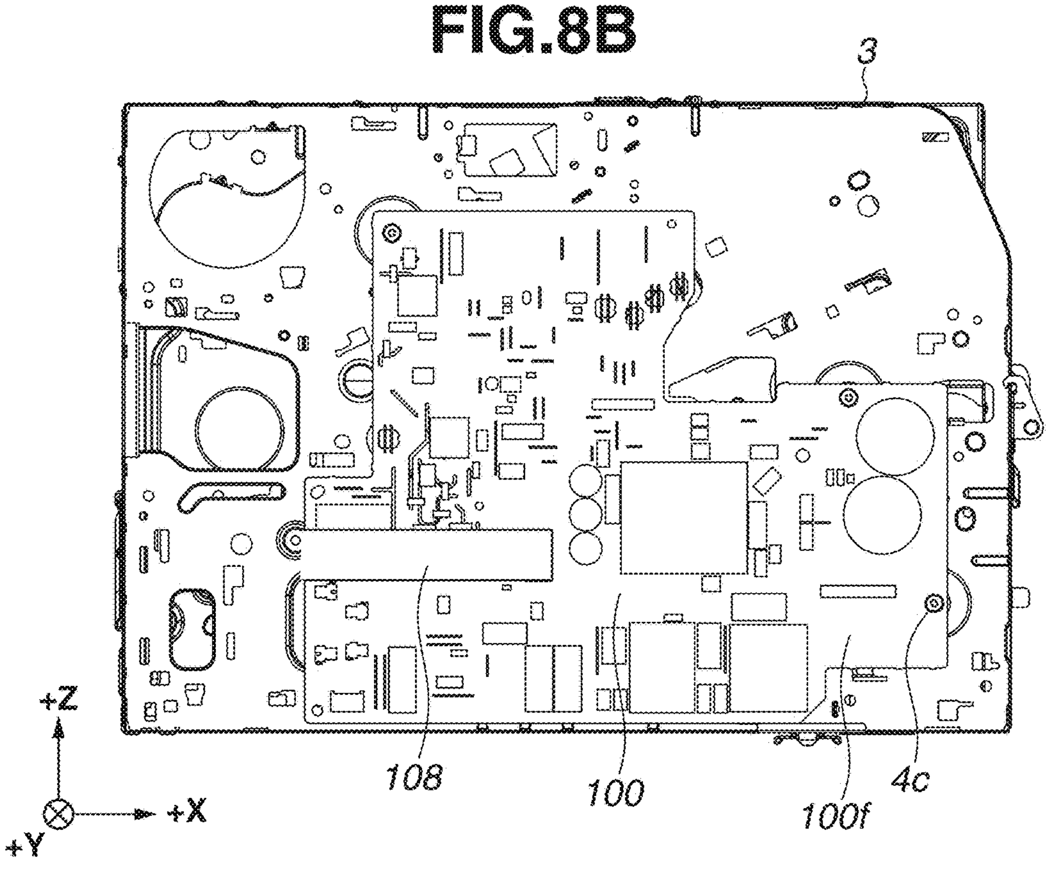
FIG. 8B is a plan view illustrating a modification example of the frame and the circuit board.

FIG. 8A is a plan view illustrating the circuit board 100 of the first exemplary embodiment, and FIG. 8B is a plan view illustrating a circuit board 100 of a modification example.

As illustrated in FIG. 8A, in the X direction, a center portion 102 is a position at which a distance between an end portion 108*a* (one end) of the circuit board 100 on a −X direction side and the center portion 102 is equal to a distance between an end portion 108*b* (the other end) of the circuit board 100 on a +X direction side and the center portion 102. The through-hole 100*a* is closer to the center portion 102 than the end portions 108*a* and 108*b*. Accordingly, the second contact portion 120*c* can be arranged at a position close to the center portion 101 in the X direction in comparison with a case in which the through-hole 100*a* is close to the end portion 108*a* or 108*b*.

On the other hand, as illustrated in FIG. 8B, a slit 108 can be arranged on a circuit board 100. The slit 108 is formed on an end portion of the circuit board 100 on a −X direction side. In a case where the slit 108 is provided on the end portion as illustrated in FIG. 8B, the circuit board 100 is likely to crack. Accordingly, as illustrated in FIG. 8A, the circuit board 100 preferably has the through-hole 100*a* without the slit 108 on the end portion.

In the present exemplary embodiment, the support unit 110 includes the two metal plates of the controller support portion 110*a* and the communication unit support portion

110*b* which are connected. However, the support unit 110 may include one metal plate. Alternatively, the circuit board 100 may include three or more metal plates.

In the present exemplary embodiment, the support unit 110 supports both of the controller 6 and the communication unit 7. However, the support unit 110 may support one of the controller 6 and the communication unit 7. Alternatively, the support unit 110 may support an object other than the controller 6 and the communication unit 7.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-106709, filed Jun. 29, 2023, which is hereby incorporated by reference herein in its entirety.

What is claimed is:

1. An image forming apparatus comprising:

a circuit board including a first surface and a second surface that is a back side of the first surface in a direction orthogonal to the first surface;

a first member that supports the circuit board and covers at least one portion of the first surface of the circuit board;

a second member that covers at least one portion of the second surface of the circuit board; and a support member connected to the first member and the second member and configured to support the first member and the second member, wherein the circuit board has a through-hole that penetrates from the first surface to the second surface, and wherein the support member passes through the through-hole and is connected to the first member and the second member.

2. The image forming apparatus according to claim 1, wherein the support member includes:

a penetration portion configured to come into contact with the first member and pass through the through-hole, a first contact portion configured to come into contact with the second member, and a second contact portion configured to come into contact with the second surface of the circuit board.

3. The image forming apparatus according to claim 2, wherein the support member includes a restriction portion extending in a direction orthogonal to the first surface, and wherein, as viewed in a first direction parallel to the first surface within a horizontal direction, the restriction portion is arranged opposite the second member and is configured to restrict movement of the second member in the first direction.

4. The image forming apparatus according to claim 3, wherein the second member includes a third member and a fourth member, and wherein the second member includes a connection portion in which one portion of the third member and one portion of the fourth member are connected.

5. The image forming apparatus according to claim 4, wherein the support member includes a third contact portion, and wherein the third contact portion is configured to come into contact with a first contacted portion of the second member to support the second member.

6. The image forming apparatus according to claim 4, wherein the third member supports a controller configured to control an image forming operation of the image forming apparatus, and wherein the fourth member supports a communication unit configured to control communication between the image forming apparatus and an external apparatus.

7. The image forming apparatus according to claim 3, wherein the circuit board has a center portion, wherein the center portion is a position at which a distance between one end of the circuit board in the first direction and the center portion is equal to a distance between another end of the circuit board in a direction along the first surface and the center portion, and wherein the through-hole is closer to the center portion than the one end in the first direction and the other end.

8. The image forming apparatus according to claim 2, wherein the second member includes a contacted portion configured to come into contact with the first contact portion.

9. The image forming apparatus according to claim 1, wherein the circuit board includes a high-voltage power supply circuit and a low-voltage power supply circuit.

10. The image forming apparatus according to claim 1, wherein the second member supports at least one of a controller configured to control an image forming operation of the image forming apparatus or a communication unit configured to receive print data from an external apparatus.

11. The image forming apparatus according to claim 1, wherein each of the first member, the second member, and the support member is formed of a metal plate.

* * * * *